D. E. SOMES.
Canal Boats and other Vessels for the Transportation of Grain.
No. 82,887. Patented Oct. 6, 1868.
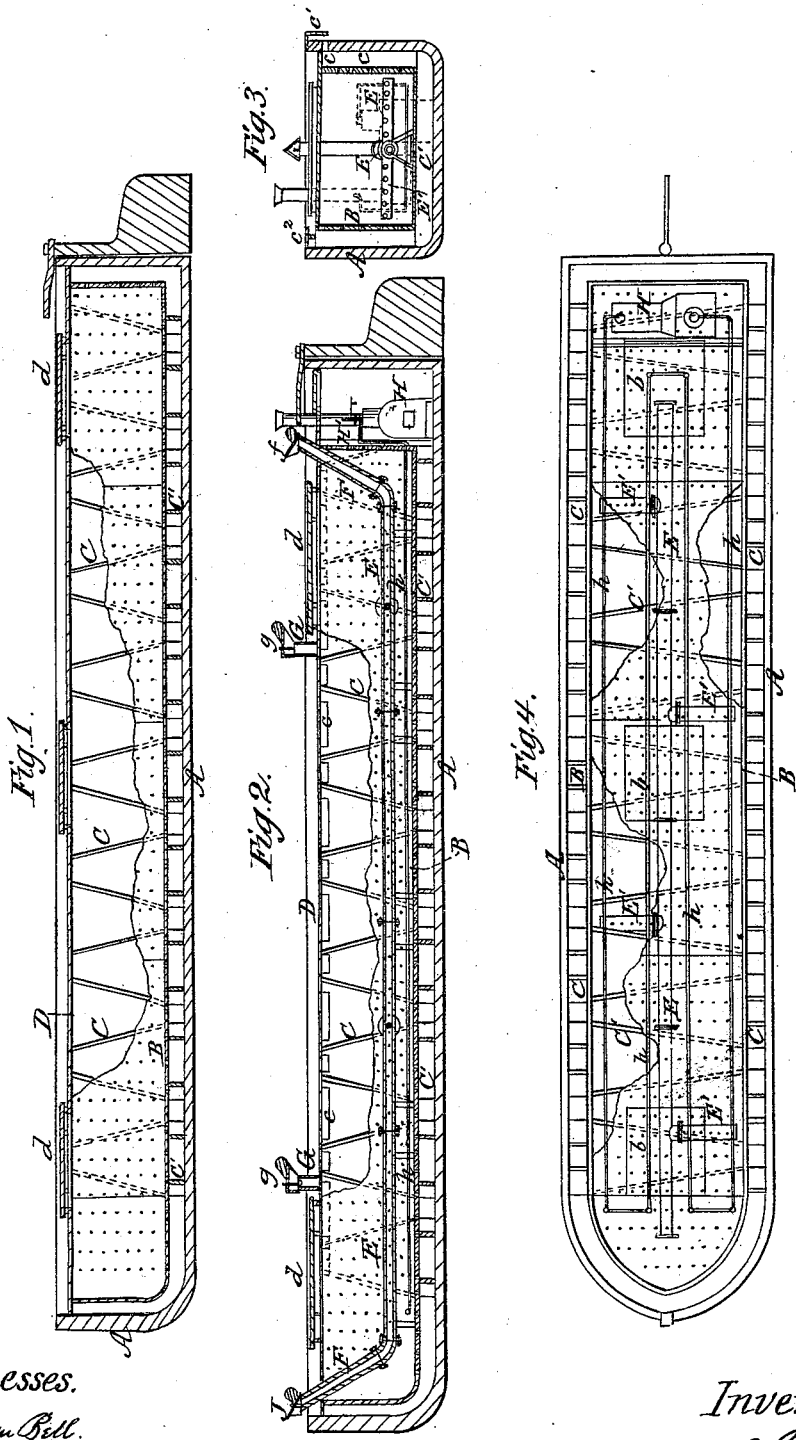
Witnesses.
J. Snowden Bell.
F. C. Somes.
Inventor.
D. E. Somes.

UNITED STATES PATENT OFFICE.

DANIEL E. SOMES, OF WASHINGTON, DISTRICT OF COLUMBIA.

IMPROVEMENT IN CANAL-BOATS AND OTHER VESSELS FOR THE TRANSPORTATION OF GRAIN.

Specification forming part of Letters Patent No. 82,887, dated October 6, 1868.

*To all whom it may concern:*

Be it known that I, DANIEL E. SOMES, of Washington, in the county of Washington, District of Columbia, have invented an Improvement in Cooling Vessels, Cars, Grain, &c.; and I do hereby declare that the following is a full, clear, and exact description thereof, reference being had to the accompanying drawings, which make part of this specification, and in which—

Figures 1 and 2 represent vertical longitudinal sections of boats having my improvements attached; Fig. 3, a vertical transverse section of the boat shown by Fig. 2, and Fig. 4 a plan or top view of the same with the deck removed.

In Figs. 1, 2, and 4 portions of the lining or casing are broken away to show the construction more clearly.

It is a well-known fact that grain, when stored in bulk, whether in graneries or in canal-boats, ships, or cars, is liable to become injured from spontaneous heat generated by dampness and the natural oil of the grain. The large percentage of loss arising from this cause, in the transportation of corn, wheat, oats, and other kinds of grain, renders any feasible means to keep the grain cool and dry a great desideratum.

The object of my invention is to provide effectual means for preserving grain from heating and consequent injury while *in transitu*, whether it be shipped in good order or in an unripe or damp condition, and also to prevent other articles, such as dry-goods, boots and shoes, leather, &c., from being injured by dampness, mold, or mildew.

My improvements consist, first, in providing a vessel or car with perforated lining or casing, forming the bottom and walls of the compartment in which the grain is contained, and having an air-space around it, through which a circulation of fresh air is maintained; secondly, in a perforated air tube or tubes passing longitudinally through the vessel or car, and communicating with air-ducts opening above the deck or roof, through which fresh air is conducted and passes out into the mass of grain; thirdly, in inclined partitions arranged within the space between the perforated lining and sides and bottom of the vessel or car, forming flues for circulating fresh air through the same, as well as effectually staying and supporting the casing; fourthly, in heating the grain, when rendered necessary by continued damp or foggy weather, by means of steam, hot-water, or hot-air pipes or flues passing through, under, or around it.

In the accompanying drawings, which show a convenient arrangement of parts for carrying out the objects of my invention, A represents the hull of a canal-boat adapted to the transportation of grain in bulk by use of my improvements, and B a perforated lining or casing placed within it, the casing being surrounded by an air-space, by which it is separated from the bottom and sides of the vessel, and covered by the deck D, provided with hatches $d$, for the introduction and removal of the grain.

The casing B may be composed of wood, or sheet metal, or wire-gauze, or their equivalents, as may be preferred, and is perforated throughout with holes for the passage of air, the holes being made sufficiently small in diameter to prevent the grain from falling through them. The casing is made in sections, so as to be readily introduced and removed, and its floor is provided with trap-doors $b$, to give access to the space beneath it for purposes of cleaning, repair, &c.

Inclined partitions C, of wood or metal, are placed in the space between the sides of the casing and the hull, and similar partitions C' in the space beneath the floor of the casing. These partitions support and stay the casing B and form flues, through which air is circulated in the following manner: The partitions C are inclined in alternate directions, and consequently the flues which they form will alternately have their large and small ends upward. When the temperature of the water in which the vessel floats is lower than that of the air, the air will be condensed in those flues which have their small ends uppermost, as those flues present a large area of cooling-surface toward their bottoms, and will fall by reason of its increased gravity, drawing with it fresh air from above; and as the flues which have their large ends uppermost present a large area of heating-surface toward their tops, the air in them will be rarefied and ascend, drawing with it air from below, to be replaced by the descending currents of the flues first stated. The vertical flues being connected by the horizontal ones C', a constant circulation of air is kept up around and under the lining or casing B and into the mass of grain by means of the ascending and descending currents in the flues. When the water is warmer than the air, a reverse action to that just described will take place, the circulation being maintained in a reverse direction.

A perforated air-tube, E, extends longitudinally through the grain-compartment, communicating at its ends with the air-ducts F, the opposite ends of which are above the deck and open to the air, being provided with cowls or hoods $f$, so constructed as to always present their openings to the direction from which the wind is blowing, by which means it is caused to rush down the ducts F and into the air-pipe E, from which it escapes through the numerous small openings with which the latter is perforated into the mass of grain which surrounds it. This device furnishes an additional means of supplying fresh and cool air to the grain.

The pipe E is made in sections, so as to be readily taken down and removed, if desired, and can be placed at any height in the grain-compartment as deemed most convenient and suitable for the purpose.

Two or more pipes may be employed; or the pipe E may be provided with branch pipes E', connected to it at different points in its length, and extending vertically or horizontally into the mass of grain, for the purpose of affording a more thorough distribution of air thereto.

In cases of long storms or continued foggy weather, &c., it may become necessary to dry the grain and prevent the accumulation of moisture therein by means of artificial heat; and for this purpose I provide a heating apparatus, stove, furnace, or boiler in a compartment of the boat, separated from the grain by a fire-proof bulk-head or partition, and having connected with it pipes or flues, which pass through, around, or under the mass of grain, or into or through the perforated pipe E, and through which steam, hot water, or hot air is caused to pass when necessary to warm or dry the grain. In this instance a steam-boiler, H, is shown placed in a compartment at the stern of the boat, and separated from the casing B by a fire-proof bulk-head, H'.

A series of steam-pipes, $h$, is connected to the steam-dome of the boiler, which pass through the grain-compartment, and, emerging therefrom, open into the chimney.

When necessary, in damp or stormy weather, steam can be raised in the boiler H, and, passing through the pipes $h$, it warms and dries the grain in the compartment through which it passes. Hot air, hot water, or the products of combustion from the furnace may be conducted through the grain-compartment in an equivalent manner, if preferred. For instance, when the products of combustion are used in lieu of steam or water to heat and dry the grain, &c., they are conducted through pipes or flues from the furnace, and out at some convenient point; or the pipes may be returned and made to pass up the chimney-opening at or near its top, thus conveying the heat and smoke from the furnace, as above.

By closing the chimney-flues below the point where the pipes enter the chimney by means of a damper or its equivalent, the draft of the pipes will be increased.

When water is used in pipes instead of steam, it is heated on the principle of the well-known water-back, or by passing the pipes through the furnace.

In order to prevent rain from entering the flues formed by the partitions C, they may be covered by a longitudinal guard or weather-strip, $c^2$, elevated a sufficient distance above them to prevent the entrance of rain, and yet allow free passage to the air; or they may be entirely closed at top, and ports or openings $c$ be made in the side of the vessel, opening into the flues, and protected from the rain by a side guard, $c^1$. The ports can be provided with doors or shutters, whereby they can be closed, if desired. Fig. 3 of the drawings shows both devices.

In order to afford exit for the warm air from the mass of grain when the latter is heated by the boiler H, as before described, ventilators G are placed in the deck, having cowls or hoods at top, the vanes of which are so arranged that the closed end of the cowls will always be presented to the wind, thereby preventing it from blowing into the ventilator and impeding the exit of the heated air; or openings may be made below the deck into the side flues for the escape of heated or foul air.

The advantages of my improvements as applied to the transportation of grain for long distances, and particularly at the low rate of speed used upon canals, will be obvious to those who have been connected with this branch of commerce; and it is, moreover, apparent that the several devices herein described may be employed either in conjunction or independently, as found most suitable.

My improvements are readily adaptable to railroad-cars; and for the transportation of valuable and perishable articles for long distances—as, for instance, a trip from the Atlantic to the Pacific coast, with the delays and risks incident thereto—their adoption would be attended with the most beneficial results.

Having thus fully described my invention, what I claim therein as new, and desire to secure by Letters Patent, is—

1. A canal-boat or other vessel or vehicle having a perforated lining or casing, with spaces for the circulation of air between it and the walls of the vessel or vehicle, substantially as and for the purpose set forth.

2. A canal-boat or other vessel or vehicle with a perforated false floor, with air-space between it and the bottom of the vessel or vehicle, substantially as set forth.

3. Heating apparatus, in combination with ventilating-tubes G, perforated tubes E, and hoods $f$, substantially as set forth.

4. Perforated lining B, ventilating-tubes G, hoods $f$, openings $c$, guards $c^1\ c^2$, substantially as described.

5. A canal-boat or other vessel or vehicle having a perforated casing or lining, inclosing air-flues, and a heating apparatus, substantially as and for the purpose set forth.

6. The perforated lining B, perforated tubes E, and air-ducts F, or their equivalents, substantially as described.

7. The perforated lining with inclined partitions, forming flues between it and the walls or bottom of the vessel, or both, substantially as described.

8. The heating apparatus, in combination with the perforated lining and ventilating-tubes G, as set forth.

9. The air-tube E, in combination with the ventilating-tubes G, as set forth.

The above specification signed by me.

D. E. SOMES.

Witnesses:
F. C. SOMES,
A. M. STOUT, Jr.